United States Patent [19]

Dublirer

[11] 4,262,279
[45] Apr. 14, 1981

[54] ALARM SYSTEM FOR USE IN A VEHICLE AND METHOD

[76] Inventor: James S. Dublirer, P.O. Box 255344, Sacramento, Calif. 95825

[21] Appl. No.: 948,703

[22] Filed: Oct. 5, 1978

[51] Int. Cl.³ .......................................... B60R 25/10
[52] U.S. Cl. ............................... 340/63; 307/10 AT; 340/528
[58] Field of Search .......................... 340/63, 64, 528; 307/10 AT; 180/114, 287

[56] References Cited

U.S. PATENT DOCUMENTS

| | | | |
|---|---|---|---|
| 3,585,584 | 6/1971 | Behrend | 340/64 |
| 3,649,962 | 3/1972 | Bedard et al. | 340/64 |
| 3,781,854 | 12/1973 | Kaufman et al. | 340/64 |
| 3,788,422 | 1/1974 | Bowler | 180/114 |
| 3,858,175 | 12/1974 | Kopera, Jr. | 307/10 AT X |
| 3,866,168 | 2/1975 | McGuirk, Jr. | 340/64 |
| 3,936,673 | 2/1976 | Kelly et al. | 307/10 AT |
| 3,961,310 | 6/1976 | Grant | 340/65 |
| 3,967,239 | 6/1976 | Steele | 340/63 |
| 3,968,474 | 7/1976 | Danahey | 340/63 |
| 3,983,534 | 9/1976 | Goodman | 340/63 |
| 3,997,870 | 12/1976 | Horvath | 340/63 |
| 4,107,543 | 8/1978 | Kaplan | 340/64 X |
| 4,123,745 | 10/1978 | Gurgone | 340/63 |
| 4,151,507 | 4/1979 | Willis | 340/64 |

*Primary Examiner*—John W. Caldwell, Sr.
*Assistant Examiner*—Joseph E. Nowicki
*Attorney, Agent, or Firm*—Flehr, Hohbach, Test

[57] ABSTRACT

An alarm system for use with a vehicle is disclosed herein and operates between two primary states, an alarm ready state and an owner-identification state, depending upon certain sequential events relating to the positions of the vehicle's normal entry ways and key actuated ignition. In order to activate the system, a vehicle entry signal is produced in response to the opening of any entry way into the vehicle, however, only during the period when this system is in its alarm ready state. The entry signal in turn initiates an alarm signal for activating an alarm but only after a delay sufficient to allow the owner to identify himself by placing the system in its owner-identification mode, thereby cancelling initiation of the alarm signal.

8 Claims, 3 Drawing Figures

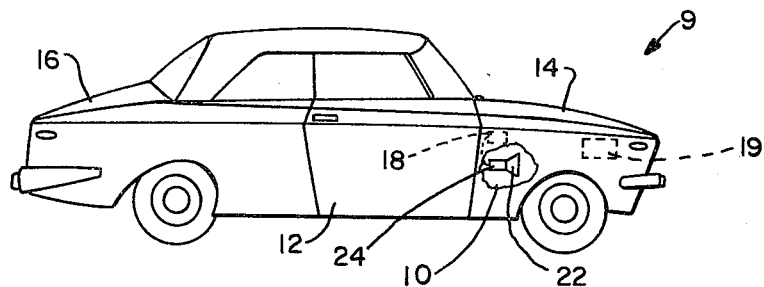
FIG.—1
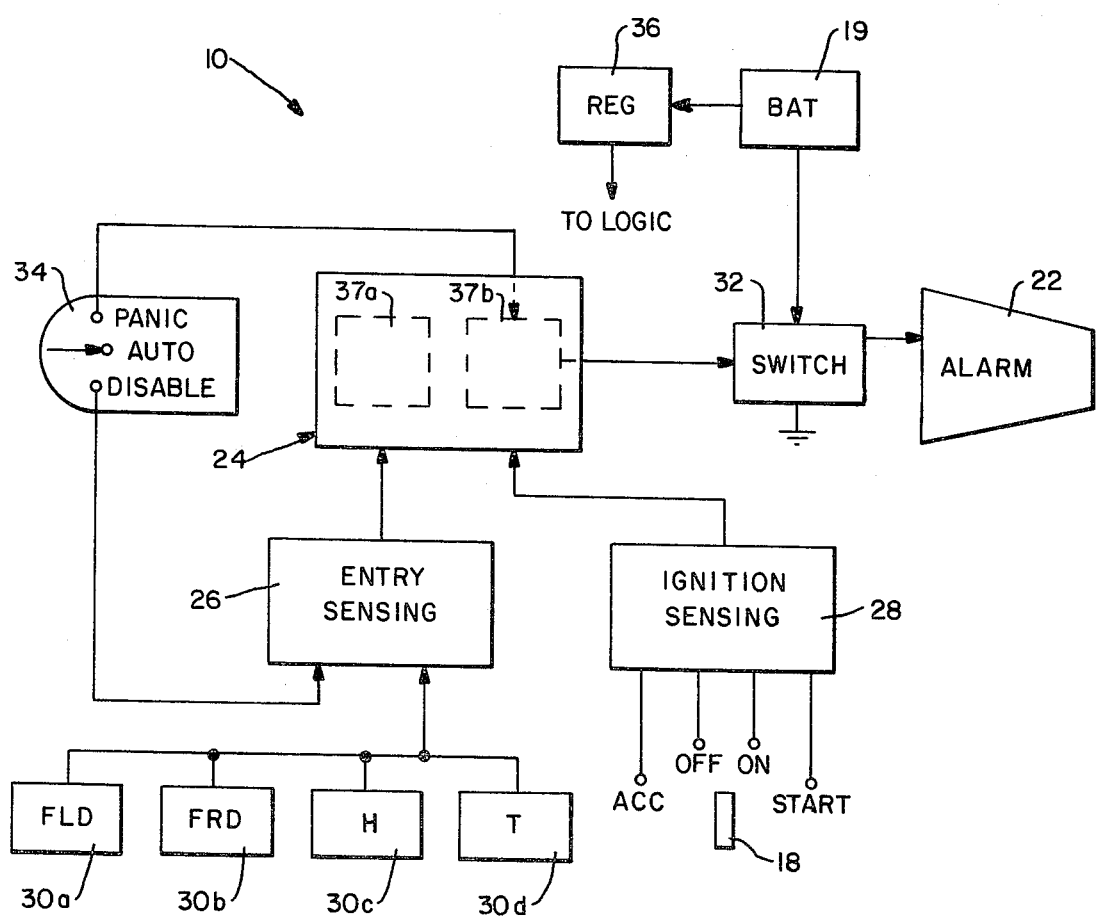
FIG.—2

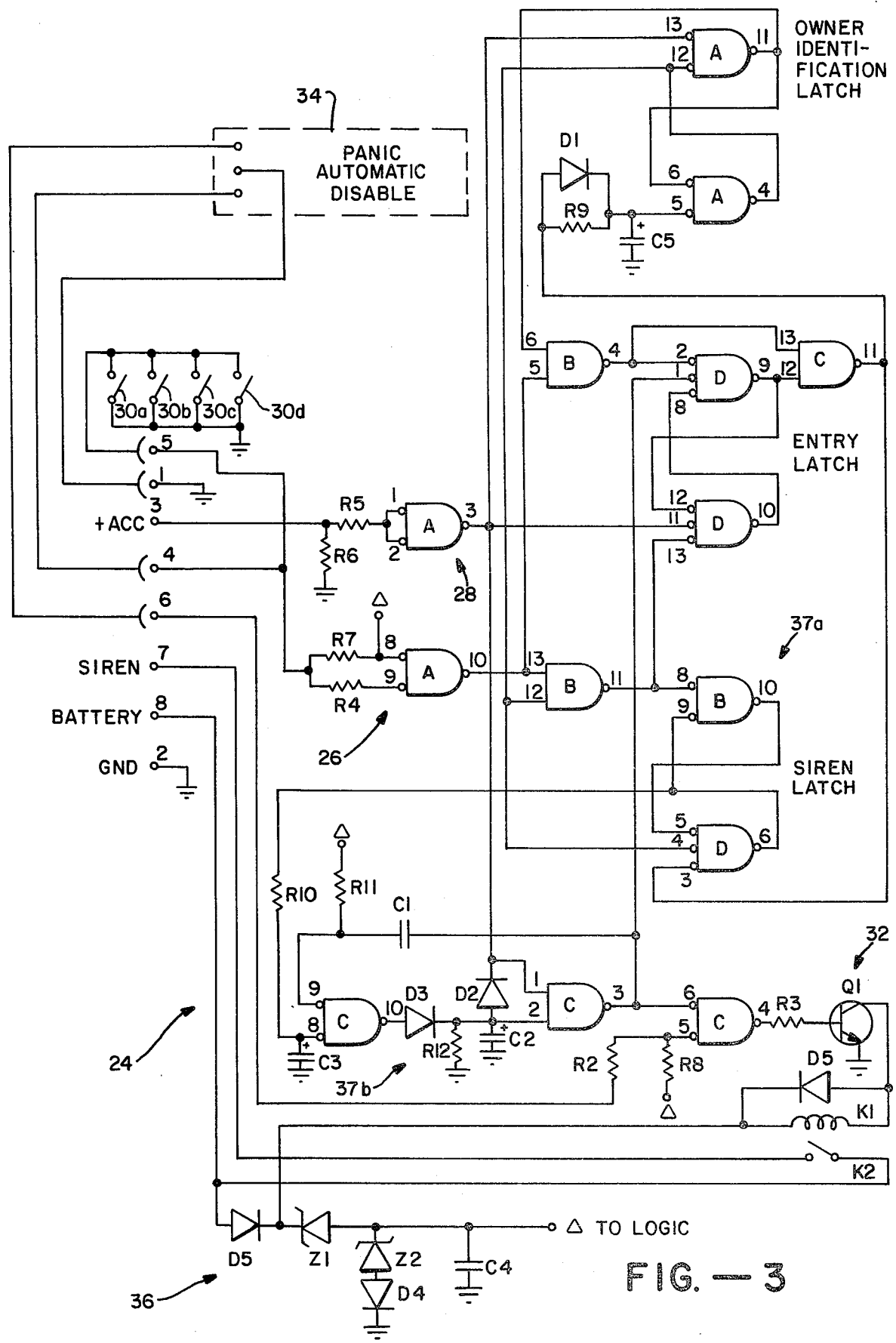
FIG. —3

ALARM SYSTEM FOR USE IN A VEHICLE AND METHOD

BACKGROUND OF THE INVENTION

The present invention relates generally to alarm systems and more particularly to an alarm system and method for use in a vehicle having at least one normal entry way therein and a key actuated ignition movable between an inoperative position and at least one operative position.

The idea of protecting vehicles, particularly one's automobile from theft is not new. There are a number of different types of systems which are presently available and which differ greatly from one another, both operationally and in design. Some of these alarm systems are more sophisticated than others and generally more costly and others, while being less sophisticated and less costly, provide less protection or, in any event, less modes of operation. A number of examples of different types of alarm systems disclosed in the prior art may be found in the following U.S. patents:

| | | | |
|---|---|---|---|
| 3,649,962 | (Badard) | 3,997,870 | (Horvath) |
| 3,788,422 | (Bowler) | 3,936,673 | (Kelly, et al.) |
| 3,968,474 | (Danahey) | 3,858,175 | (Kopera) |
| 3,983,534 | (Goodman) | 3,866,168 | (McGuirk) |
| 3,961,310 | (Grant) | 3,967,239 | (Steele) |

As will be seen hereinafter, the overall alarm system constructed in accordance with the present invention and its overall method of operation are not taught or suggested in any of the recited patents. In fact, many of these patents disclose systems having distinct disadvantages which the alarm system disclosed herein is designed to overcome. For example, while the Badard patent recited above is directed to a vehicle burglar alarm system, this system requires the owner to exit the vehicle (car) within a preset time, specifically 120 seconds, after turning off the ignition or the system will rearm itself and cause a false alarm when the owner does finally leave. Moreover, a hidden switch is used to disable this system and hence, if it is located by a thief, the entire system would be defeated. In the Danahey patent, an alarm system is disclosed but also requires a hidden switch for arming purposes. In the alarm system disclosed in Goodman, like the system in Danahey, if the owner does not exit within a predetermined time limit, specifically from the time he turns the ignition key off, the system rearms itself and a false alarm results when the owner finally does leave the vehicle.

As will be seen hereinafter, the alarm system designed in accordance with the present invention and its method of operation provide a number of advantages over and above those alarm systems which applicant is aware of and eliminates many previous disadvantages including those recited above. Moreover, as will also be seen, the alarm system disclosed herein is uncomplicated in design, reliable in use and economical to provide.

OBJECTS AND SUMMARY OF THE INVENTION

One object of the present invention is to provide an uncomplicated, economical and yet reliable alarm system for use in a vehicle, particularly a vehicle having a number of normal entry ways and a key actuated ignition movable between the inoperative (off) position and a number of operative (on, start and accessory) positions.

Another object of the present invention is to provide a vehicle alarm system which automatically provides 24-hour a day protection without requiring the owner to perform any acts other than those normally associated with driving a vehicle.

Still another object of the present invention is to provide an alarm system which operates in three distinct modes, an automatic mode for providing the 24-hour a day protection referred to above, a disabling mode for preventing the system from activating and a panic mode for overriding the system and providing immediate activation thereof.

Yet another object of the present invention is to provide an alarm system which when operating in its automatic mode operates solely on predetermined sequences of events relating to the positions of the vehicle entry ways (e.g. its doors, trunk or backhatch and hood) and the position of its ignition, each sequence depending on the natural acts of the driver in the course of driving the vehicle.

Still another object of the present invention is to provide an alarm system which does not require external key switches combination locks or hidden switches.

Yet another object of the present invention is to provide an alarm system utilizing a readily observable switch associated with its automatic, disabling and panic modes and particularly a switch which nevertheless can be operated only by the owner to place the system in its disabled mode and which, if severed, immediately places the system in its automatic mode.

Still another object of the present invention is to provide an alarm system which when operating in its automatic mode actually operates continuously between an alarm ready state and an owner-identification state, depending upon the most recent prior positional sequence or events of the vehicle entry ways and ignition.

A further object of the present invention is to provide an alarm system which when operating in its alarm ready state will ultimately initiate an alarm signal in response to the opening of an entry way by a thief even though the thief immediately closes the entry way.

Still a further object of the present invention is to provide an alarm system which is adapted to operate from the vehicle battery but which minimizes the use of the battery by automatically limiting activation of its alarm to a fixed period.

Yet a further object of the present invention is to provide an alarm system which when operating in its owner-identification state allows significant freedom to the driver to perform a number of different tasks after stopping the vehicle engine without inadvertently activating the alarm, including the ability to remain within the vehicle for any length of time immediately after the motor has been shut off as well as the ability to leave the vehicle and return within a prescribed period of time, again without inadvertently activating the alarm.

Still a further object of the present invention is to provide an alarm system which employs state of the art integrated circuit technology so as to provide substantially all of its circuitry on a circuit board 3″ by 3″ in size.

Yet a further object of the present invention is to provide a system which is sensitive to all normal modes of intrusion, specifically including all the vehicle doors, its hood and its trunk or backhatch.

Still a further object of the present invention is to provide an alarm system which can be readily installed in the vehicle, maintaining electrical isolation between the alarm system circuitry and existing vehicle circuitry.

Yet a further object of the present invention is to provide a method of protecting a vehicle from theft incorporating the various objects recited above as well as other objects and features which will become apparent from the detailed description to follow.

As stated previously, the alarm system disclosed herein is one which is especially suitable for use in a vehicle (car) having at least one but preferably a number of normal entry ways therein and a key actuated ignition movable between an inoperative position and at least one operative position. This system includes an audio alarm which is adapted for mounting within the vehicle or car and means for connecting the alarm to a source of power in response to an alarm signal for activating the alarm. This system also includes means for continuously sensing the position of each entry way and the ignition, preferably 24 hours a day, and a control circuit connected with the sensing means, all in accordance with the present invention.

The control circuit just recited operates between two states: (1) an alarm ready state during a period after the opening and subsequent closing of an entry way following the movement of the vehicle ignition from an operative position to its inoperative position but prior to the subsequent movement of the ignition back to an operative position, and (2) an owner-identification state for other times. Moreover, this control circuit includes means for producing a vehicle entry signal in response to the opening of an entry way but only during the period when the control circuit is in its alarm ready state and means for producing an alarm signal a predetermined period of time after and in response to the initiation of the entry signal and so long as the control circuit remains in its alarm ready state. In this way, the owner of a protected vehicle can enter the vehicle, start the motor and drive off while at the same time automatically causing the control circuit to switch from its alarm ready state to its owner-identification state without performing any other act. Moreover, the driver can stop, open his door, exit the vehicle and then close the door and leave the vehicle while simultaneously automatically causing the control circuit to move back to its alarm ready state, again without performing any other acts.

From the foregoing, it should be apparent that the driver does not cause the control circuit to move back to its alarm ready state at least until he has exited the vehicle and closed the door behind him. In this way, there is no need to rush out of the vehicle once the engine has been turned off, so long as the driver does not open and subsequently close the door while remaining inside and then opens it again to exit. If that happens, the driver should reidentify himself with the ignition key. In this regard, the alarm system designed in accordance with the present invention includes a delay when going from its owner-identification state to its alarm ready state after the owner exits and closes the door behind him. In this way, the owner can return within the delay period without initiating an entry signal. This and other features in the preferred embodiment of the present invention will be discussed hereinafter.

BRIEF DESCRIPTION OF THE DRAWINGS

FIG. 1 is a schematic illustration of a vehicle, including an alarm system constructed in accordance with the present invention.

FIG. 2 is a block diagram of the alarm system constructed in accordance with the present invention.

FIG. 3 is a schematic diagram of the alarm system illustrated in FIGS. 1 and 2.

DETAILED DESCRIPTION AND PREFERRED EMBODIMENTS

Turning now to the drawings, attention is specifically directed to FIG. 1 which illustrates a conventional automobile 9 (generally representative of all vehicles) including a number of normal entry ways, specifically doors 12, hood 14 and trunk 16 and a standard key actuated ignition which is generally indicated at 18 and which is movable between an inoperative position and a number of operative positions. This automobile also includes an alarm system 10 which is designed in accordance with the present invention. As seen in FIG. 1, system 10 includes an audio alarm 22, specifically an electrically actuated siren in the preferred embodiment, and an overall control circuit assembly 24, both of which are fixedly mounted within the automobile. As will be seen hereinafter, the control circuit assembly is provided for activating alarm 22 and operates in response to certain sequential events relating to the positions of entry ways 12, 14 and 16 and the position of ignition 18. As a result, this control assembly includes means for continuously sensing the position of each entry way and the ignition during operation of the alarm system. The control assembly also includes the necessary circuitry, specifically standard solid state logic circuitry such as CMOS which can be mounted on a circuit board 3" by 3" in size.

In an actual working embodiment of the present invention, the circuitry making up control assembly 24, with the exception of the entry way and ignition sensing devices, are in fact supported on a relatively small circuit board (3"×3") which is encapsulated in an optically clear casting substrate with eight wire leads exiting therefrom. Each wire terminates in an electrical plug, which facilitates easy installation, replacement, testing and so on. Moreover, these wires are sequentially identified with cloth wire markers utilizing the reference numerals 1–8, as best illustrated in FIG. 3. Each of the entry way position sensing devices in this actual embodiment is a pinswitch detector which is interlocked with its entry way, for example one of the doors 12, the hood 14 or the trunk 16, so as to provide an electrically open circuit when the entry way is closed and an electrically closed circuit when the entry way is open. Separate electrical wiring would be provided so as to maintain electrical isolation between the alarm system and the automobile's own electrical wiring system.

Turning to FIG. 2, alarm system 10 is shown by means of a block diagram. As illustrated in this figure, the system includes previously recited audio alarm 22 and control assembly 24 as well as an entry sensing arrangement 26 and ignition sensing arrangement 28. Entry arrangement 26 includes the previously described pinswitch detectors which are diagrammatically indicated at 30a, 30b, 30c and 30d and which are respectively provided for sensing the positions of doors 12, hood 14 and trunk 16. The ignition sensing arrangement is shown diagrammatically connected with four positions on ignition 18, specifically the OFF, ON, START and ACC (accessory) positions. In an actual working embodiment, when the ignition is in its inoperative or OFF position, an opened circuit is maintained between a predetermined terminal into control circuit assembly 24 (specifically terminal 3 in FIG. 3) and battery 19. On the other hand, when the ignition is moved to any of its operating positions, the appropriate terminal (terminal No. 3) is connected with the +12 VDC battery voltage. In this way, the system knows whether the ignition is in its inoperative position or one of its operative positions.

Alarm system 10 also includes a switching circuit 32, an override mode switch 34 and a power regulator circuit 36. As will be seen hereinafter, switching circuit 32, which actually comprises part of the circuitry on the previously recited circuit board, is connected to the output of control assembly 24 for connecting and disconnecting the automobile battery and alarm with one another for activating and deactivating the latter. The override mode switch 34 is provided for switching the mode of operation of the overall alarm system between three different modes, specifically an AUTO mode, a PANIC mode and a DISABLE mode, as will also been seen hereinafter. The power regulating circuit 36 is provided for converting the +12 VDC battery voltage to a voltage which is suitable for operating the logic circuitry making up the system, specifically to regulated +9 VDC in an actual embodiment.

Before turning to a detailed description of the circuitry making up system 10, attention is directed to the way in which this system operates to protect automobile 9. In this regard, let it first be assumed that the system is in its AUTO mode as indicated in FIG. 2. With system 10 in this mode, control assembly 24 is either in an ALARM READY State or an OWNER-IDENTIFICATION state, depending upon the previous sequence of events relating to the positions of the car entry ways and its ignition. More specifically, the control assembly is in its ALARM READY state during a period after the opening and subsequent closing of an entry way following the movement of ignition 18 from an operative position to its inoperative position, but prior to the subsequent movement of the ignition back to an operative position. The control assembly is in its OWNER-IDENTIFICATION state at all other times during the AUTO mode.

For purposes of description, let it now be assumed that the control assembly is in its ALARM READY state. At this time, any person opening any entry way into vehicle 9 is initially assumed to be a thief. When the entry way is opened, an associated pinswitch closes. This is sensed by control assembly 24 which, as will be seen hereinafter, includes circuitry generally indicated at 37a in FIG. 2 for producing a vehicle entry signal in response to the opening of the entry way but only during the period when the control circuit is in its ALARM READY state. The entry way signal is applied to circuitry 37b which also comprises part of the control assembly. This latter circuitry produces an alarm signal a predetermined period of time after and in response to the initiation of the entry signal and so long as the control circuit remains in its ALARM READY state.

As illustrated in FIG. 2, the alarm signal just described is applied to switch 32 which, in response thereto, connects alarm 22 with automobile battery 19 for sounding or activating the alarm. This of course presupposes that the individual opening the entry way is a thief or, in any event, does not possess the ignition key and the knowledge to prevent the alarm signal from being produced. Making this assumption for the moment, the alarm signal is activated a predetermined period of time after the entry way is first opened, about 20 seconds in a preferred embodiment, and can not be de-activated merely by closing the entry way, as will be seen with respect to FIG. 3. However, in a preferred embodiment, the alarm is automatically de-activated after a predetermined alarm period, for example a period of about 3 minutes, so as not to completely drain the battery or create a public nuisance.

As stated above, after an entry way is initially opened when control assembly is in its ALARM READY state and an entry signal is produced, there is a predetermined time delay before an alarm signal is initiated. This delay is sufficient to give the individual, for example the owner or other such authorized person having the ignition key and knowledge of the alarm system, time to move the ignition from its inoperative OFF position to one of its operative positions, typically to the START position. This, in turn, causes the control circuit to move to its OWNER-IDENTIFICATION state which automatically prevents the alarm signal from being produced or, if the owner is slow and the alarm signal is initiated causing the alarm to activate, immediately eliminating the alarm signal and de-activating the alarm.

At this point, it should be noted that the driver has not performed any acts other than those normally associated with driving a car, e.g. opening the car door, entering the car, closing the car door and starting the engine, and yet the alarm system is automatically de-activated. Of course, if the owner were to initially open hood 14 or trunk 16, in the system disclosed herein, the entry signal would automatically be produced and the owner would still have to move the ignition from its inoperative position to an operative position within the time required so as to prevent initiation of an alarm signal. While this may be somewhat inconvenient in situations where, for example, luggage is to be loaded into the trunk, the inconvenience can be avoided by first opening the car door, turning the ignition to an operative position, for example the ON position or ACC position and then back to its OFF position and then returning to the trunk with the key, as will become apparent hereinafter.

After the owner or other authorized person has moved the control assembly to its OWNER-IDENTIFICATION state by entering the automobile and turning the ignition key to one of its operative positions as described above, the control assembly will remain in this state until the ignition is moved back to its inoperative OFF position followed by the opening and subsequent closing of all entry ways. Hence, in the situation presently being described, once the driver stops the car, turns off the ignition, opens his car door, exits the vehicle and then closes the car door behind him, the control assembly automatically moves back to its ALARM READY state. Actually, as will be discussed below, there is a time delay between the time the driver closes the car door and the time the control assembly moves to its OWNER-IDENTIFICATION state. In any event, once this takes effect, the alarm system is again ready to provide an entry signal and possibly an alarm signal for activating alarm 22 in the event any entry way is opened. It should again be noted that all of this takes place even though the driver has performed no acts other than those normally associated with driving an automobile and yet the alarm system automatically moves from an inhibited state, specifically its OWNER-IDENTIFICATION state, to a state for protecting the vehicle, specifically its ALARM READY state.

There are certain aspects of the exit procedure just described which should be specifically noted. First, it should be noted that no change in the status of the control assembly or, for that matter, in the entire alarm system takes place or is initiated as a result of the driver merely opening his car door after stopping the car and shutting off the engine. This means that he can take as much time as he wishes to exit the car without worryring about inadvertently initiating a false alarm.

As stated above, there is a time delay, approximately 150 seconds in an actual working embodiment, between the time the driver closes the car door behind him after shutting off the engine and the time the control assembly moves from its OWNER-IDENTIFICATION state to its ALARM READY state. This means that the driver can reenter the car, either through the doors, the hood or the trunk even though he had initially closed the door behind him after initially exiting the vehicle without producing an entry signal, so long as reentry is within the delay period. Of course, if reentry takes place after the delay period, that is, after the control assembly has moved into its ALARM READY state, an entry signal will automatically be produced. However, assuming that reentry takes place within the prescribed period, the control assembly will not enter its ALARM READY state. Moreover, so long as the entry way which has been reopened remains opened, the control assembly will remain in its OWNER-IDENTIFICATION state. In addition, once this latter entry way is closed, the delay period starts anew giving the owner the full period of time, for example the 150 seconds, to again reenter the vehicle without changing the status of the system. This can be repeated indefinitely so long as reentry is made within the delay period.

From the foregoing, it should be apparent that the exit delay period just described allows the owner to perform a number of natural acts after leaving his automobile such as unloading his trunk or opening his hood at a service station to check the oil, water or the like. Moreover, this delay period allows the owner to load his trunk in the situation described previously, that is, when the automobile is in its ALARM READY state, merely by first opening a car door, turning ON and OFF the ignition and thereafter returning to the trunk with the key. Moreover, because of the delay period, the car door can be closed, so long as the trunk is opened within the exit delay period.

Alarm system 10 as illustrated in FIG. 2 has thus far been described while operating in the AUTO mode. However, as stated previously, this system can also operate in a DISABLING mode and a PANIC mode. As will be seen hereinafter, by merely moving override mode switch 34 to its PANIC position, the system automatically operates in its PANIC mode, which automatically and immediately initiates production of an alarm signal as diagrammatically indicated in FIG. 2. This alarm signal of course immediately causes alarm 22 to be activated for sounding a panic alarm. The purpose behind this particular mode should be quite apparent. It allows the driver to quickly and easily by-pass the control circuitry and use the alarm to call for help. In this regard, as will be seen hereinafter, system 10 is designed so that override mode switch 34 does not need to be hidden but rather can be in full view to everyone including a potential thief. As a result, the switch can be positioned in a location which is readilly accessible to the driver for quick operation under panic conditions.

As will be seen hereinafter, alarm system 10 cannot be placed in its DISABLE mode unless the system is already in its OWNER-IDENTIFICATION state. This prevents potential thieves from disabling the system by merely moving switch 34. In fact, in a preferred and actual working embodiment, movement of switch 34 from its AUTO position to its DISABLE position while the control assembly is in its ALARM READY state, affects the system in exactly the same way as opening an entry way when the control assembly is in its ALARM READY state, that is, causing an entry signal to be produced at circuitry 37a. However, as will also be seen hereinafter, if the control assembly is in its OWNER-IDENTIFICATION state, movement of switch 34 from its AUTO position to its DISABLE position completely disables the system which, at times, may be necessary, for example when the automobile is left at a service station or the like.

One final point regarding switch 34 relates to the situation where it is severed from the rest of the system. More specifically, as stated previously, it is desirable to locate the switch in a readily accessible position relative to the driver which means in most cases that the switch would be readily visible and accessible to a potential thief. Since the thief cannot disable the system merely repositioning the switch, the only other possible problem which could result from exposing the switch relates to the possibility that the thief severs it. However, as will be seen hereinafter, when switch 34 is in its AUTO position, it is electrically disconnected from the system and when it is in either its PANIC position or its DISABLE position, it is in electrical contact with the remainder of the system. Hence, should a thief purposely disconnect the switch or should a service station attendant disconnect it while the switch is in its DISABLE position, the system will automatically place itself in its AUTO mode.

Having described the operation of alarm system 10 with respect to FIG. 2, attention is now directed to FIG. 3 for a detailed discussion of the circuitry making up control assembly 24 including circuitry 37a and 37b, switching circuit 32 and regulator 36. As illustrated in FIG. 3, the circuitry making up these various components includes a number of NAND gates incorporated within integrated circuits A, B, C and D, each of which gates include two or three numbered inputs and a numbered output. Since these gates are NAND gates, each maintains a low voltage level (LO) output only when all inputs are at a high voltage level (HI). Under any other conditions, the output at each NAND gate is HI. The remaining circuitry includes a number of resistors R2, R3 and so on, diodes D1, D2 and so on, Zener diodes Z1 and Z2 and capacitors C1, C2 and so on. Obviously, the value of these various components will depend upon the particular operation of the circuitry to be described hereinafter. With regard to the capacitors, those which are used for time delay purposes could obviously vary in value depending upon the delay desired. The circuitry also includes a conventional NPN transistor Q1 and associated electromagnetic relay including relay coil K1 and normally opened contact K2. Also, note that the previously described pinswitches 30a to 30d are shown along with OVERRIDE mode switch 34.

As stated previously, the circuitry comprising control assembly 24 includes eight input terminals generally indicated at 1, 2 and so on up to 8. As illustrated in FIG. 3, the terminal 1 is a plug-in terminal which connects the center pole of switch 34 (which is an SPDT center-off toggle switch ) to chassis ground. Terminal 2 is a ground terminal and may be connected electrically to the vehicle's chassis, which represents the negative terminal of the vehicle battery. Terminal 3 (+ACC) is connected to the hot side of the 12 VDC battery 19, for example by connecting it to a point at the fuse box, but only when the ignition 18 is positioned in its ACC, ON, or START position. Terminal 4 which is a plug-in terminal is electrically connected to the DISABLE position of switch 34. Terminal 5 which is directly connected with terminal 4 is also connected with the entry way sensors or pinswitches 30. Terminal 6, another plug-in terminal, is connected to the last position on switch 34, specifically the PANIC position. Terminal 7 is the siren terminal, and while not shown, is connected directly with alarm 22 and is provided with battery voltage through terminal 8 and normally opened contact K2 of the previously described electromagnetic relay. Terminal 8, as just stated, is connected to the positive terminal of battery 19.

Turning now to an operational discussion of the circuitry just described, attention is first directed to regulator 36. This regulator is specifically provided to convert the 12 VDC voltage from battery 19 to a usable voltage for the logic circuitry making up the overall system. As seen in FIG. 3, this regulator includes two Zener diodes Z1 and Z2 along with two directional diodes D4 and D5 and a filter capacitor C4, all of which reduce the 12 VDC voltage to a stable, regulated 9 VDC level at its output, generally designated by the delta symbol ($\Delta$). Note that this delta output is applied to three points in the circuitry, specifically to input A8 of integrated circuit A, to one side of resistor R8 and to one side of resistor R11. It should also be noted that the regulator provides continuous power to each integrated circuit at pin 14 (not shown).

In describing the remaining circuitry, let it first be assumed that swhich 34 is in its AUTO position and that the control assembly is in its previously described ALARM READY state. Under these conditions, as stated previously, any person opening an entry way is assumed to be a thief until he proves otherwise by turning the ignition key. When the entry way is first opened, one of the pinswitches 30 closes. This grounds input A9 (which is normally biased HI through resistors R4 and R7 to the regulated power delta). Output A10 goes HI, causing output B11 to go LO. This in turn causes outputs B10 and D10 to go HI. The outputs at B10 and D10 going HI can be thought of as the previously described entry signal. When output B10 goes HI, output D6 goes LO, terminating power to capacitor C3 which begins discharging. When output D10 goes HI, output D9 goes LO which latches output D10 (the entry signal) into a HI state. This locks in the entry delay interval, that is, the entry signal, so a thief cannot halt the process by reclosing the offending door, as described previously. Note that in order for the entry delay to be initiated, the override mode switch 34 must be in the center (AUTO) position. If the owner when he last exited the car, had left the switch in the DISABLE mode, input A9 would already be grounded through terminals 1 and 4 and an entry signal would not result. Note also that if a thief reaches through the car's opened window and moves the override mode switch 34 from AUTOMATIC mode to DISABLE mode in an effort to circumvent the system, input A9 is grounded just as though the thief had opened an entry way. This initiates the entry signal and starts the entry delay in the very same manner as opening an entry way. This is highly advantageous in that there is no need to hide the switch, as stated previously. In fact, as also stated previously, it is quite advantageous to have the switch in an exposed position, at least a readily accessible position, so that it can be easily used under panic situations.

Assume now that the entry delay timing capacitor C3 is allowed to discharge which takes a predetermined period of time (the entry delay period), for example 20 seconds. When the capacitor is fully discharge, input C8 (which has been dropping with the capacitor) goes LO. This causes output C10 to go HI. Input C2, nominally biased LO ow by resistor R12, now goes HI, causing output C3 to go LO. In turn, output C4 goes HI. This latter output when in its HI state may be thought of as the previously described alarm signal and, as illustrated in FIG. 3, is applied to the base of transistor Q1 through resistor R3 for causing the transistor to conduct ground to the relay coil K1. In this regard, it should be noted that the transistor and relay coil comprise part of previously described switch 32. When the transistor conducts ground to coil K1, the latter is energized causing normally opened contact K2 to close. This, in turn, causes pure, unprocessed battery voltage to be applied directly from battery 19 to the alarm 22 for sounding the latter.

Two events may occur at this point, either the owner arrives with his key to de-activate the alarm or he does not. If the owner does not arrive, the capacitor C1 which has been charging charges up through resistor R11 in a predetermined period of time, specifically about 3 minutes in a preferred embodiment. At that time, the output C10 goes LO, output C3 goes HI, output C4 goes LO, the transistor Q1 stops conducting, thereby de-energizing the relay coil and de-activating the alarm. In this way, the alarm is activated only for a predetermined period of time, as described previously, so as not to drain the automobile battery or create a public nuisance.

Assume now the same situation as directly above, that is, that the system is in an ALARM READY state and an entry way is opened but this time assume that the entry way is opened by the owner or other such authorized person having the ignition key. As stated previously, as soon as the entry way is opened, an entry signal is initiated. However, when the owner switches the ignition to one of its operative positions, the battery voltage is automatically applied to input terminal 3 (+ACC). As a result, inputs A1 and A2, which normally are biased LO by resistor R6, now go HI. Resistor R5 protects the gate from transients. Output A3 goes LO, producing three distinct effects. First, output A11 goes HI, causing output A4 to go LO. This in turn latches A11 into a HI state. The HI output at A11 places the system in its OWNER-IDENTIFICATION mode. Whenever output A11 is HI, the overall system recognizes the presence of the owner and does not try to repel intrusion, but rather prevents an alarm signal from being produced. Since output A11 is latched into a HI state, the owner is free to remove his key, drive the car, listen to his radio or whatever within the car. Second, output D10 which may or may not have been HI (depending upon the positions of the entry ways) automatically goes HI at this time. Output D9 goes LO, which causes output C11 to go HI. This HI output at C11 passes through diode D1, forcing input A5 to a HI state and charging up capacitor C5. This puts capacitor C5 in a condition of readiness to begin the exit delay when the owner decides to exit his car, as described previously. Third, output C3 goes HI, causing output C4 to go LO. Remember, output C4 when HI is the previously described alarm signal and hence is terminated if in fact it had been initiated by the opening of an entry way. If not, the alarm signal is prevented from being initiated at all.

It should be noted that it is irrelevant whether the siren has already activated when the owner switches the ignition to change from an ALARM READY state to an OWNER-IDENTIFICATION state. If the siren has already been activated when the owner uses his key, it is immediately deactivated. If the entry delay is still running and the alarm has not yet been activated when the owner uses his key, output D6 goes high, instantly recharging capacitor C3 and halting the progress leading to an alarm signal. Turning the ignition key is the only available method to prevent or cancel an alarm signal once an entry signal has been produced while in the ALARM READY state.

Assume now that the owner is in the vehicle, that the system is in its OWNER-IDENTIFICATION state and that the owner has just stopped the vehicle and turned the ignition to its OFF position. When the owner opens his door in preparation to leave the automobile, the appropriate pinswitch 30 closes to ground. This brings input A9 to ground as usual. Output A10 goes HI, causing output B4 to go LO. This is the only time that output B4 is LO, that is, when the owner is identified and an entry way is opened. Output C11 is still HI, as explained above, needing only the condition of B4 to revert to a LO state for it to terminate power to capacitor C5. Output B11 is not influenced by output A10 going HI because input B12 is always LO during the OWNER-IDENTIFICATION state. As a result, the system is not affected merely by the door opening and the exit delay described previously is not initiated. This means that the owner can leave the door open as long as he pleases in the process of leaving the car. This is of course an advantageous feature in that it gives the owner a large degree of flexibility. For example, in practical terms, the owner might need a protracted period of time to unload the groceries or luggage and he can do this, even though he does not take the ignition key with him.

When the owner is finally finished with his tasks associated with the car, he closes the door behind him and walks away. Note that he has done nothing special or out of the ordinary. There are no switches to reset, no extra keys, and most important there is nothing to remember. System 10 makes no demands whatever upon the owner. Nevertheless, when the owner walks away, after a predetermined period of time, the system automatically moves from its OWNER-IDENTIFICATION state to an ALARM READY state. Operationally, when the door does finally close, the associated pinswitch 30 is disconnected from ground. Input A9 is now biased HI by the regulator output delta through resistors R7 and R4. Output A10 goes LO, causing output B4 to revert to a HI state. As explained above, this is the only remaining requirement for output C11 to go LO and terminate power to exit delay capacitor C5. Capacitor C5, which is of fairly large value, now begins to discharge to ground through resistor R9 and through internal losses. As it discharges, (the exit delay period) the voltage at input A5 drops steadily. This process is responsible for timing the exit delay, for example a delay of 2½ minutes. During this period, two possible situations might occur, either the owner reopens one of the entry ways or he allows the entire period to pass without reopening an entry way.

By providing the exit delay just described, the owner has the privilege of reopening any of the entry ways within about 2½ minutes of the time he last exited. If the door is reopened within the exit delay, the exit delay resets to its maximum amount and the owner may leave the door open as long as he pleases. When he again closes the door, the exit delay begins afresh at about 2½ minutes. Operationally, by reopening the entry way within the exit delay, the associated pinswitch 30 closes to ground. Input A9 goes LO, output A10 goes HI, output B4 goes LO, output C11 goes HI leading power directly to capacitor C5. Capacitor C5 then fully recharges, returning the exit delay to its maximum amount. When the owner once again closes the door, it is just as though he had never opened it and capacitor C5 begins discharging to clock off the full exit delay.

Assume now that the owner does not return to his car but allows the exit delay to expire. In this case, capacitor C5 fully discharges and input A5 is left in a LO state. Output A4 goes HI, causing output A11 to go LO. It should be recalled that output A11 when HI maintains the system in its OWNER-IDENTIFICATION state. Hence, by output A11 going LO, the overall system returns to its ALARM READY state and the cycle has been completed. From this moment on, the owner is obliged to distinguish himself from a thief by turning the ignition from its inoperative position to an operative position upon entering the car.

Having described the circuitry associated with control assembly 24, override mode switch circuit 32 and power regulator 36 in detail, attention is now briefly directed to the way in which switch 34 operates to place the system in its PANIC mode and its DISABLE mode. As illustrated in FIG. 3, in the center (AUTO) position, the system functions as described. It is important to note that switch 34 is not connected electrically with the remainder of the system while in this position. Therefore, even if switch 34 were completely cut from the system, the system would function in its automatic mode, as stated previously.

If switch 34 is moved to its DISABLE position, two possibilities exit. Either this movement was carried out by the owner (or other authorized person) or it was done by a thief. If switch 34 is moved to the DISABLE position by a thief and assuming this is donw when the system is in its ALARM READY state, the input A9 is automatically grounded as would be the case if one of the entry ways were opened. Thus, the alarm will activate at the end of the entry delay. This is true whether the thief first opens the door to access the switch or puts his hand through a window without opening a door.

Where the owner wishes to use the DISABLE mode he must first identify himself by turning the ignition to an operative position, that is, by placing the system in its OWNER-IDENTIFICATION state. At this time he is free to enter the DISABLE mode. When he does this, the system sees what is in effect an entry way which has opened but never closed (upon exiting the vehicle) because input A9 remains grounded. Consequently, the exit delay previously described does not commence.

Therefore, the system cannot go into its ALARM READY state. In conclusion, no alarm signal can result from the opening of an entry way.

Finally, switch 34 can be placed in its PANIC position. When this occurs, ground is applied to input C5 through protective resistor R2. Input C5, which is nominally biased HI through resistor R8, goes LO. This causes output C4 to go HI (producing the previously described alarm signal) causing the transistor Q1 to conduct, relay coil K1 to energize and the alarm to immediately activate.

What is claimed is:

1. An alarm system for use in a vehicle having a battery, a number of entry ways including at least two doors, a trunk and a hood and a key actuated ignition switch movable between an inoperative position and at least one operative position, said system comprising:

(a) an audio alarm mounted within said vehicle;

(b) means for connecting said alarm to the battery of said vehicle in response to an alarm signal for activating said alarm;

(c) means for continuously sensing the position of each of said entry ways and said ignition switch during operation of said system;

(d) a control circuit connected with said sensing means and operating between two states depending solely upon predetermined positioning sequences of said entry ways and ignition switch, said states including (i) an alarm ready state during a period after the opening of one or more of said entry ways and subsequent closing of all entry ways following the movement of said ignition switch from an operative position to its inoperative position but prior to the subsequent movement of said ignition back to an operative position, and (ii) an owner-identification state at all times prior to the start of said alarm ready state period and after said period when said ignition switch is moved back to its operative position;

(e) said control circuit including (i) delay means for starting said period during which said control circuit is in said alarm ready state at a time when all of said entry ways have continuously remained closed for a fixed duration after said subsequent closing of all of said entry ways;

(ii) means for producing a vehicle entry signal in response to the opening of said entry way but only during said period when said control circuit is in its alarm ready state, (iii) means for locking said entry signal producing means in a signal producing mode for continuously producing said entry signal throughout said period once said entry signal is initiated, whereby the subsequent closing of said entry way during said period does not inhibit the production of said entry signal, (iv) means for producing an alarm signal for a fixed duration starting a predetermined period of time after and in response to the initiation of said entry signal and so long as said control circuit remains in its alarm ready state, said alarm signal producing means being connected with said battery connecting means for applying said alarm signal thereto, said alarm signal producing means including means for automatically discontinuing production of said alarm signal for deactivating said alarm at the end of said fixed duration;

(f) means adapted for connection with said alarm signal producing means for automatically activating said alarm regardless of the state of said circuit means or the presence or absence of said entry signal; and (g) means including a switch movable between a first position for disabling operation of said alarm system when said control circuit is in said owner-identification state and a second non-disabling position, said disabling means being connected with said entry signal producing means for producing an entry signal when said disabling means is moved to said first disabling position while said control circuit is in its alarm ready state.

2. An alarm system according to claim 1 wherein said means including said switch is connected with said control circuit and functions as an open entry way when in its disabling position, said switch being connected into said system such that severing of said switch therefrom automatically places said disabling means in a non-disabling position regardless of its position prior to severing of said switch, whereby said switch can be place in plain view within said vehicle.

3. An alarm system for use in a vehicle having a number of entry ways including at least one door and a key actuated ignition switch movable between an inoperative position and at least one operative position, said system comprising:

(a) an audio alarm and source of power mounted within said vehicle;

(b) means for connecting said alarm to said source of power in response to an alarm signal for activating said alarm;

(c) means for continuously sensing the position of each of said entry ways and said ignition switch during operation of said system;

(d) a control circuit connected with said sensing means and operating between two states depending upon predetermined positioning sequences of said entry ways and ignition switch, said states including (i) an alarm ready state during a period after the opening of one or more of said entry ways and subsequent closing of all entry ways following the movement of said ignition switch from an operative position to its inoperative position but prior to the subsequent movement of said ignition back to an operative position, and (ii) an owner-identification state at all times prior to the start of said alarm ready state period and after said period when said ignition switch is moved back to its operative position;

(e) said control circuit including (i) delay means for starting said period during which said control circuit is in said alarm ready state at a time when all of said entry ways have continuously remained closed for a fixed duration after said subsequent closing of all of said entry ways;

(ii) means for producing a vehicle entry signal in response to the opening of said entry way but only during said period when said control circuit is in its alarm ready state, (iii) means for locking said entry signal producing means in a signal producing mode for continuously producing said entry signal throughout the remainder of said period once said entry signal is initiated, whereby the subsequent closing of said entry way during said period does not inhibit the production of said entry signal,
  (iv) means for producing an alarm signal at least for a fixed period of time starting a predetermined period of time after and in response to the initiation of said entry signal and so long as said control circuit remains in its alarm ready state, and;
(f) means operable between a first position for disabling operation of said alarm system when said control circuit is in said owner-identification state and a second non-disabling position, said disabling means being connected with said control circuit so as to act as an open entry way when in its first disabling position.

4. An alarm system according to claim 3 wherein said alarm signal producing means includes means for automatically discontinuing production of said alarm signal for deactivating said alarm at the end of said fixed period of time.

5. An alarm system according to claim 3 including means adapted for connection with said alarm signal producing means for volitionally activating said alarm regardless of the state of said circuit means or the presence or absence of said entry signal.

6. An alarm system according to claim 3 wherein said disabling means is connected with said entry signal producing means for producing an entry signal when said disabling means is moved to said first disabling position while said control circuit is in its alarm ready state.

7. An alarm system according to claim 6 wherein said disabling means includes a switch movable between a first disabling position and a second non-disabling position, said switch being connected into said system such that severing of said switch therefrom automatically places said disabling means in its non-disabling position regardless of its position prior to severing of said switch, whereby said switch can be placed in plain view within said vehicle.

8. A method of protecting a vehicle having a number of entry ways including at least two doors and a key actuated ignition switch movable between an inoperative position and at least one operative position, said method comprising:
(a) placing an audio alarm source of power and a control circuit within said vehicle;
(b) connecting said alarm to said source of power in response to an alarm signal for activating said alarm;
(c) continuously sensing the position of each of said entry ways and said ignition switch during operation of said system;
(d) operating said control circuit between two states depending upon predetermined positioning sequences of said entry ways and ignition switch, said states including
  (i) an alarm ready state during a period after the opening of one or more of said entry ways and subsequent closing of all given entry ways following the movement of said ignition switch from an operative position to its inoperative position but prior to the subsequent movement of said ignition switch back to an operative position, and
  (ii) an owner-identification state at all times prior to the start of said alarm ready state period and after said period when said ignition switch is moved back to its operative position;
(e) starting said period during which said control circuit is in said alarm ready state at a time when all of said entry ways have continuously remained closed for a fixed duration after said subsequent closing of all of said entry ways;
(f) producing a vehicle entry signal in response to the opening of said entry way but only during said period when said control circuit is in its alarm ready state;
(g) continuously producing said entry signal throughout the remainder of said period once said entry signal is initiated, whereby the subsequent closing of said entry way during said period does not inhibit the production of said entry signal;
(h) producing an alarm signal at least for a period of time starting a predetermined period of time after and in response to the initiation of said entry signal and so long as said control circuit remains in its alarm ready state; and
(i) providing a switching circuit including a switch in cooperation with said control circuit and disabling protection of said vehicle by placing said switch in a predetermined position when said control circuit is in said owner-identification state so as to cause said switch to act as an open entry way.

* * * * *